US011984310B2

(12) United States Patent
Lehmann et al.

(10) Patent No.: US 11,984,310 B2
(45) Date of Patent: May 14, 2024

(54) MASS SPECTROMETRY APPARATUS

(71) Applicant: Analytik Jena GmbH, Jena (DE)

(72) Inventors: Roland Lehmann, Jena (DE); Wolfram Weisheit, Saara (DE); Iouri Kalinitchenko, Jena-Maua (DE)

(73) Assignee: Analytik Jena GmbH, Jena (DE)

( * ) Notice: Subject to any disclaimer, the term of this patent is extended or adjusted under 35 U.S.C. 154(b) by 78 days.

(21) Appl. No.: 17/663,074

(22) Filed: May 12, 2022

(65) Prior Publication Data

US 2022/0367167 A1 Nov. 17, 2022

(30) Foreign Application Priority Data

May 12, 2021 (EP) .................................... 21173703

(51) Int. Cl.
*H01J 49/10* (2006.01)
*H01J 49/00* (2006.01)
*H01J 49/04* (2006.01)
*H01J 49/06* (2006.01)

(52) U.S. Cl.
CPC ........ *H01J 49/105* (2013.01); *H01J 49/0031* (2013.01); *H01J 49/0495* (2013.01); *H01J 49/067* (2013.01)

(58) Field of Classification Search
CPC .. H01J 49/105; H01J 49/0031; H01J 49/0495; H01J 49/067; H01J 49/14; H01J 49/0422; H01J 49/26
USPC ........................................................... 250/282
See application file for complete search history.

(56) References Cited

U.S. PATENT DOCUMENTS 4,948,962 A * 8/1990 Mitsui ..................... H01J 49/12 250/281
5,559,337 A 9/1996 Ito
5,773,823 A 6/1998 Ito
5,804,821 A 9/1998 Nakagawa
6,031,579 A 2/2000 Stephenson
6,265,717 B1 * 7/2001 Sakata .................. H01J 49/067 250/281
6,614,021 B1 9/2003 Kalinitchenko
6,630,665 B2 10/2003 Tanner et al.
(Continued)

FOREIGN PATENT DOCUMENTS

DE 202020106423 U1 2/2021
WO 2004012223 A1 2/2004
(Continued)

*Primary Examiner* — Kiet T Nguyen
(74) *Attorney, Agent, or Firm* — Christopher R. Powers; Endress+Hauser (USA) Holding, Inc.

(57) ABSTRACT

A method of operating an inductively coupled plasma mass spectrometry apparatus for analyzing an analyte sample, the mass spectrometry apparatus including a plasma ion source, a mass analyzer and an interface arrangement positioned between the plasma ion source and the mass analyzer of the mass spectrometer, the interface arrangement at least including an interface structure, including a sampling or skimmer cone, and at least one passage with an inlet and an outlet into a reaction zone, the method including: generating a plasma using the plasma ion source and forming a plasma flux to flow towards the mass analyzer; supplying the analyte sample into the reaction zone via the passage such that the analyte sample interacts with the plasma flux; and analyzing the analyte sample using the mass analyzer.

15 Claims, 3 Drawing Sheets

(56) References Cited

U.S. PATENT DOCUMENTS

| | | | |
|---|---|---|---|
| 6,815,667 B2 | 11/2004 | Tanner et al. |
| 7,119,330 B2 | 10/2006 | Kalinitchenko |
| 7,329,863 B2 | 2/2008 | Kalinitchenko |
| 2016/0026747 A1 | 1/2016 | Garaas et al. |
| 2018/0240662 A1 | 8/2018 | Schwieters et al. |

FOREIGN PATENT DOCUMENTS

| | | |
|---|---|---|
| WO | 2012024570 A2 | 2/2012 |
| WO | 2016096457 | 6/2016 |
| WO | 2017176131 A1 | 10/2017 |

* cited by examiner

MASS SPECTROMETRY APPARATUS

CROSS-REFERENCE TO RELATED APPLICATION

The present application is related to and claims the priority benefit of European Patent Application No. 21173703.6, filed May 12, 2021, the entire contents of which are incorporated herein by reference.

TECHNICAL FIELD

The present disclosure relates to a method of operating an inductively coupled plasma mass spectrometry apparatus for analyzing a molecular analyte substance or a mixture of at least two substances.

BACKGROUND

Inductively coupled plasma mass spectrometers (ICP-MS) are, e.g., used for trace element analysis. Typically, an ICP-MS analysis involves the complete atomization and subsequent ionization of the test sample by means of a plasma source before the resulting elemental ions are quantified by the spectrometer. Up to now, several different types of ICP-MS are available, such as, e.g., the quadrupole ICP-MS or time-of-flight ICP-MS.

A common problem of any ICP-MS analysis is the possible occurrence of interferences caused by newly forming polyatomic ions or molecules. Such interferences are often addressed by means of reaction/collision cells in the respective ICP-MS system, whereby reagent gases are added to the reaction/collision cell to provide for a separation of analyte ions from interferences based upon their energy differences. An exemplary ICP-MS system for improved attenuation of interferences is described in U.S. Pat. No. 7,329,863 B2 and U.S. Pat. No. 7,119,330 B2.

ICP-MS systems are less suitable or even unsuitable for the analysis of molecules, which are typically investigated by mass spectrometers employing different types of ionization sources, e.g., electrospray-ionization (ESI) or atmospheric pressure chemical ionization (APCI). Such methods are optimized for the ionization of molecules and do not lead to an atomization of them.

Other mass spectrometry systems suitable for molecular analysis are, e.g., the selected-ion flow-tube mass spectrometer (SIFT-MS) or the proton-transfer-reaction mass spectrometer (PTR-MS)

However, up to now, no mass spectrometry system is available, which allows for the analysis of atomized and ionized molecules in one single device.

SUMMARY

Therefore, the objective technical problem underlying the present disclosure is to provide such possibility for analyzing atomized and ionized molecules in one single device. This object is achieved by the method and by the use according to the present disclosure.

Regarding the method, the object is achieved by a method of operating an inductively coupled plasma mass spectrometry apparatus for analyzing an analyte sample, the mass spectrometry apparatus including a plasma ion source, a mass analyzer and an interface arrangement positioned between the plasma ion source and the mass analyzer of the mass spectrometer, the interface arrangement at least comprising an interface structure in the form of a cone, e.g., a sampling cone or a skimmer cone, and at least one passage with an inlet and an outlet, the passage leading from an outside of the interface structure into a reaction zone formed in an area surrounding the outlet of the passage.

The method comprises the steps of: generating a plasma using the plasma ion source and forming a plasma flux to flow towards the mass analyzer; supplying the analyte sample into the reaction zone via the passage such that the analyte sample interacts with the plasma flux; and analyzing the analyte sample using the mass analyzer.

The molecular analyte substance or mixture may initially be provided in the form of a gas, a vapor or a liquid. The analyte sample preferably is a molecular analyte substance or a mixture of at least two substances.

The interface structure may comprise one or more cones, e.g., it can comprise a sampler and a skimmer cone, or a sampler cone, a skimmer cone and at least one additional cone.

The passage used for introducing the substance or mixture may, e.g., be such as described in U.S. Pat. No. 7,329,863 B2 and U.S. Pat. No. 7,119,330 B2. In the context of the present disclosure full reference is made to both references. The passages in the references given, however are used for an entirely different purpose, which is attenuating interferences. The same set-up can however also be used to facilitate molecular analysis by means of an ICP-MS, as suggested by the present disclosure.

The present disclosure advantageously allows to analyze analyte samples, in particular a molecular sample, by means of an ICP-MS utilizing an entrance-based collision/reaction cell. The analyte sample is supplied via the at least one passage such that an ion beam is formed in the reaction zone which proceeds towards the mass analyzer.

In case of a conventional ICP-MS, the plasma into which the analyte sample is introduced, generally has a relatively high pressure (e.g., atmospheric pressure). The plasma vaporizes and ionizes the sample, and the ions are subsequently extracted and transferred to a mass analyzer via a differentially-pumped interface, the mass analyzer generally operated at a relatively low pressure, typically at $<10^{-5}$ Torr. The space between succeeding cones decreases in a stepwise manner. By introducing the analyte sample into the passage instead of directly providing it to the area where the plasma is produced, an ionization process of the analyte sample becomes possible which is much softer and does not lead to a, especially complete, decomposition of the molecules, compared to the standard procedures used in ICP-MS. The disclosed procedure further enables parallel ionization of polar and nonpolar analytes, as well as ionization of gaseous and liquid analytes and also for fragmentation of molecules on purpose.

In one embodiment of the present disclosure, at least one reagent substance is added which serves for producing specific ions of the analyte sample by chemical ionization. The reagent substance may, e.g., be added via the at least one passage.

Advantageously, the reagent substance is one of $H_2$, $O_2$, $H_2O$, $NH_3$, $NO_3$ or any ionized, protonated or deprotonated derivative therefrom.

Another embodiment comprises that a microwave induced plasma source is used as plasma ion source. Using an ion source which includes a microwave generator has the advantage that high field strengths can be achieved along with low power dissipation. A uniform and energy efficient plasma can thus be achieved in a straightforward manner. In this regard reference is made to DE 202020106423 U1 U.S. Pat. No. 2016/0026747 A1 and WO 2017/176131 A1. In particular, such microwave based plasma ion source may comprise a dielectric resonator.

It is of advantage if argon, nitrogen, krypton, xenon, neon, helium or any mixture of at least two gases is used as a carrier gas for the plasma ion source. The choice of carrier gas depends on the reactions that are to be induced. In this regard, nitrogen particularly leads to additional reactions with reagent gases or molecules, it can be used as a carrier gas and for ionization.

One embodiment comprises that the analyte sample is split into at least two sub-parts based on at least one physical and/or chemical property of its components, e.g., size or electrical charge, before being supplied into reaction zone via the passage, wherein the sub-parts are separately supplied into the reaction zone one after the other. Such splitting can advantageously be achieved by various separation and/or fractionation methods, such as gas or liquid chromatography or, e.g., capillary, electrophoresis. For this purpose, the mass spectrometry apparatus can include appropriate means for separating, splitting or fractionation of an analyte sample, e.g., a gas or liquid chromatography or electrophoresis unit.

A further embodiment comprises that the mass spectrometer is provided with an ion optical system establishing a reflecting electrostatic field for reflecting ions along a desired path towards the mass analyzer. Such ion optical system may include any arrangement capable of deflecting a quantity of ions between two non-parallel planes, e.g., ion mirrors, reflectors, deflectors, quadrupole ion deflectors, electrostatic energy analyzers, magnetic ion optics, ion multiple guides, and the like. One preferred embodiment employs an arrangement of an ion optics "IonMirror" devices, as described in U.S. Pat. No. 6,614,021 (incorporated herein by reference), or those disclosed in U.S. Pat. Nos. 5,559,337, 5,773,823, 5,804,821, 6,031,579, 6,815,667, 6,630,665, or 6,6306,651. Using an ion mirror further increases the sensitivity of the ICP-MS device.

In another embodiment of the method, the interface structure:

- separates a first vacuum region at a relatively high pressure adjacent a first surface of said interface structure, which receives the plasma flux from the plasma ion source from a second vacuum region at a relatively low pressure adjacent a second surface of said interface structure, which leads to the mass analyzer; and
- provides an aperture having axial extension forming the reaction zone located between the first surface and the second surface of the interface structure, through which the plasma flux flows from the first region towards the second region, and wherein the passage leads into the reaction zone formed in the aperture of the interface structure.

The analyte sample thus is directed into the reaction zone where it interacts with the plasma which is already at a lower pressure compared to the pressure in the area of the plasma ion source. This makes the ionization much softer and leads to notably less fragmentation processes.

One embodiment comprises that the interface arrangement at least comprises a sampling cone and a skimmer cone, the skimmer cone being arranged behind the sampling cone.

Yet, in another embodiment, at least two passages are provided in the interface arrangement. The at least two passages may be provided in the same cone or in two different cones, e.g., one in the skimmer cone and one in the sampling cone. By providing more than one passage, more than one reaction zone is created enabling for multi-reactions.

In one embodiment, the passage is completely located within at least one cone, e.g., the sampler, the skimmer cone or any other cone. Such device is, e.g., suggested in U.S. Pat. No. 7,329,863 B2.

In another embodiment however, the passage is located behind the sampler cone, the skimmer cone or any other cone, as described in U.S. Pat. No. 7,119,330 B2.

In a further embodiment the analyte sample and/or the reagent substance is/are supplied via the passage at least during a first time interval and supplied to an area of the plasma ion source, where the plasma is formed, at least during a second time interval. By this procedure, a conventional ICP-MS analysis relating to a structural analysis can be combined with a molecular analysis. The first and second time interval can be carried out alternately, or can be initiated on demand.

The object of the present disclosure is further achieved by use of an inductively coupled mass spectrometry apparatus, the mass spectrometry apparatus including a plasma ion source, a mass analyzer and an interface arrangement positioned between the plasma ion source and the mass analyzer of the mass spectrometer, the interface arrangement at least comprising an interface structure in the form of a cone of the interface arrangement, e.g., a sampling cone or a skimmer cone, and at least one passage with an inlet and an outlet, the passage leading from an outside of the interface structure into a reaction zone formed in an area surrounding the outlet of the passage, for analyzing a molecular analyte sample. The mass spectrometry apparatus is in particular used for molecular analysis by carrying out a method according to at least one of the embodiments described above.

BRIEF DESCRIPTION OF THE DRAWINGS

The present disclosure as well as its preferred embodiments will be further explained based on the figures, which include.

In the figures, same elements are provided with the same reference numbers.

DETAILED DESCRIPTION

Figure 1:
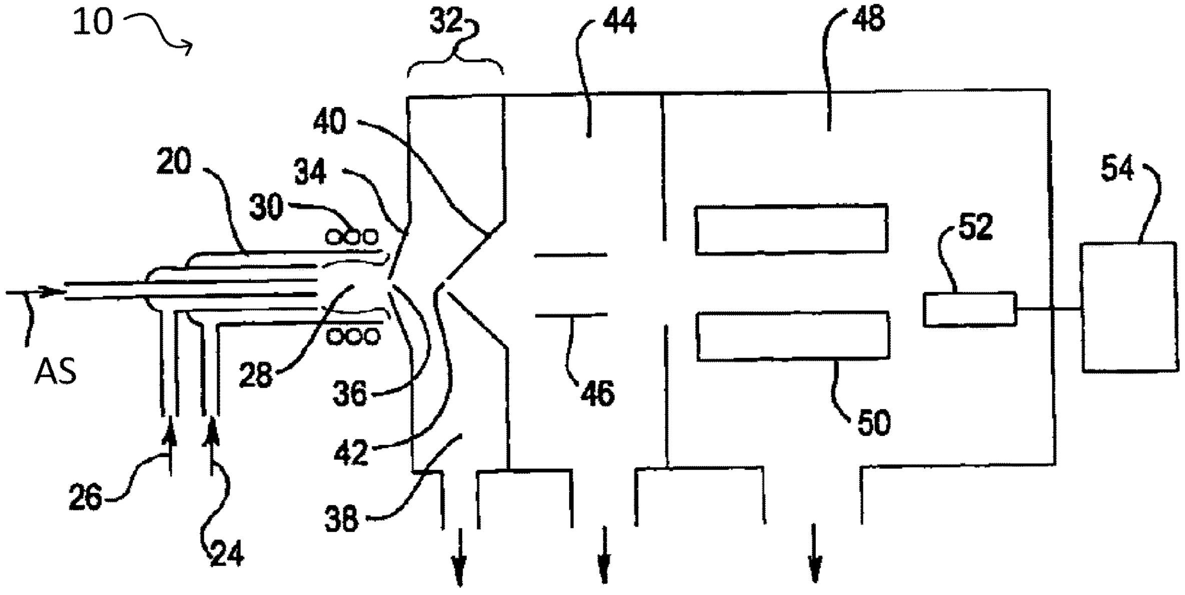
FIG. 1 shows a conventional ICP-MS according to the state of the art.

FIG. 1 schematically illustrates a conventional ICP-MS 10 with an ion source 20 in the form of an inductively coupled plasma torch having a central tube for conveying the analyte sample AS in a carrier gas into a plasma 28 produced in the torch. The ion source 20 further includes an intermediate tube for conveying a plasma forming gas 24 and an auxiliary gas 26, which can, e.g., be argon or nitrogen, a radio frequency coil 30 arranged around the outer tube.

The mass spectrometer further comprises an interface arrangement 32 for transferring the analyte sample and plasma flux 28 into the analyzing part of the ICP-MS including an interface structure comprising a sampling cone 34 and a skimmer cone 40. Both cones 34, 40 each have a hole 36, 42 at its apex through which the plasma flux 28 passes from the ion source 20 into a fist 38 and second 44 vacuum region. The cones 34, 40 are typically water-cooled. The second vacuum region 44 in the embodiment shown further comprises an ion extraction electrode 46 and other ion optics [not shown] all being part of the ion optical system, which serves for extracting an ion beam from the plasma flux 28 into a third pumped vacuum region 48 and towards mass analyzer 50 which separates the ions according to their mass-to-charge-ratio and towards detector 52, where the detected ions are read out by recording means 54. Different mass analyzers 50, such as a quadrupole or time-of-flight (TOF) mass analyzer 50 may be employed. Utilizing a TOF analyzer has the advantage of being capable of discriminating resulting polyatomic ions.

Figure 2A:
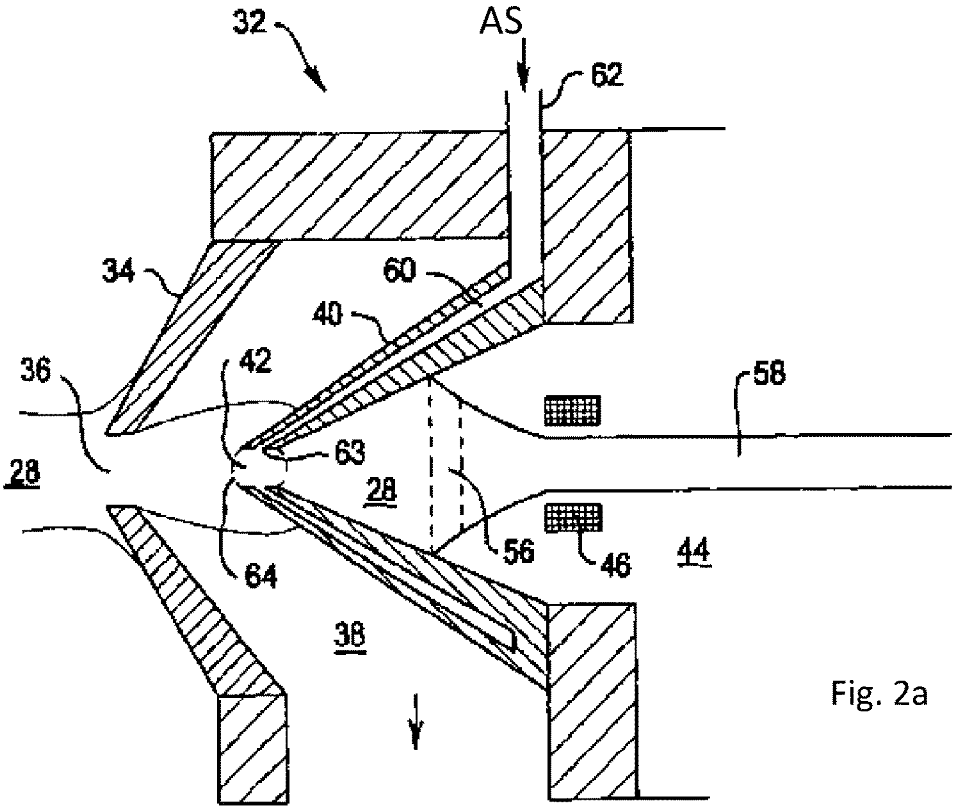
FIGS. 2*a*-2*d* show exemplary embodiments for an interface arrangement with at least one cone having at least one passage for introducing the analyte sample.
Figure 2B:
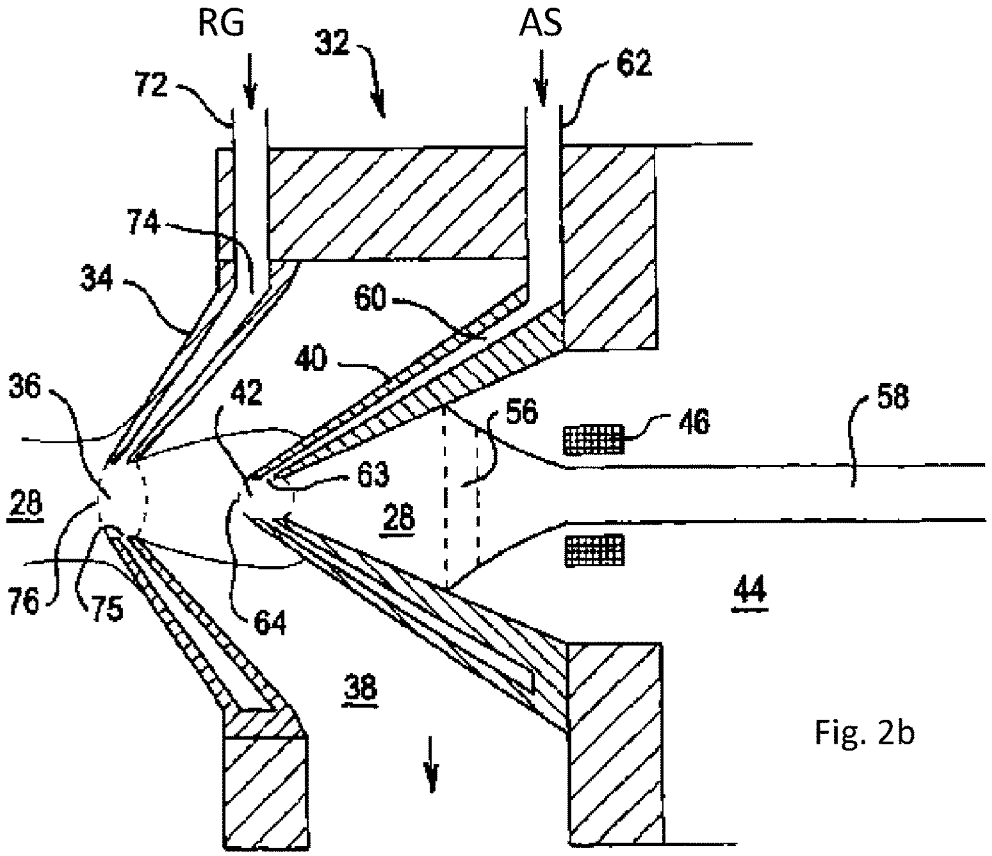
Figure 2C:
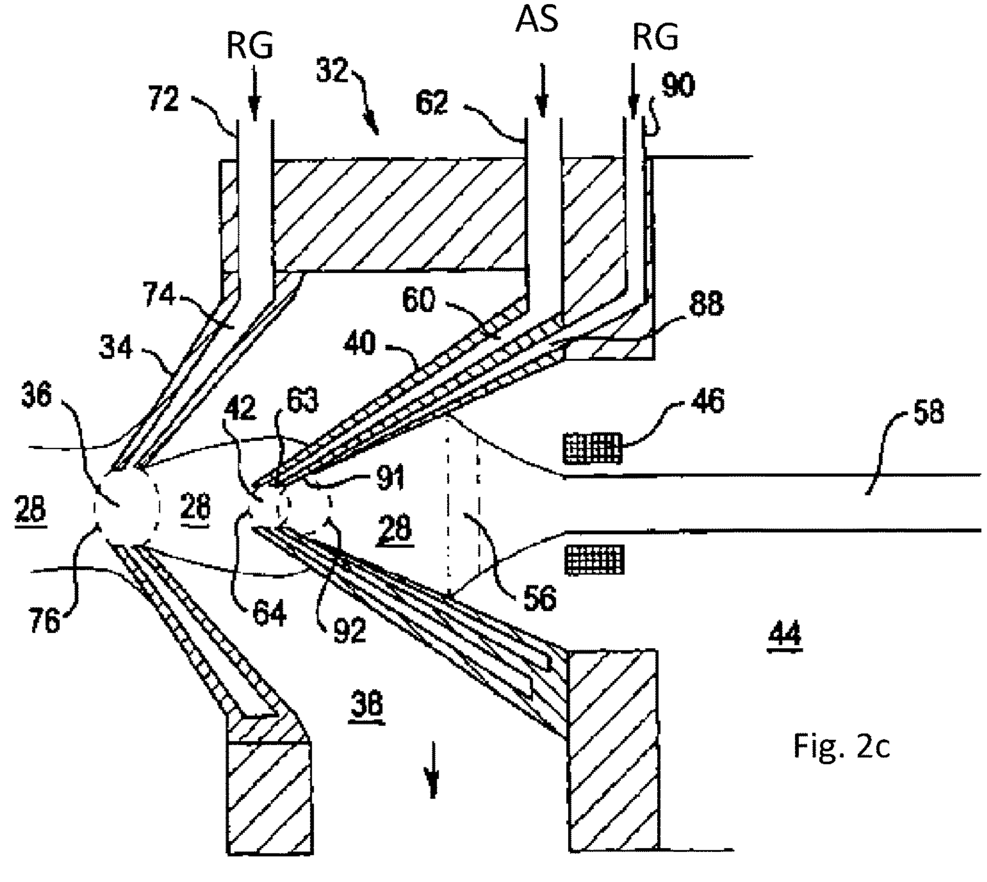
Figure 2D:
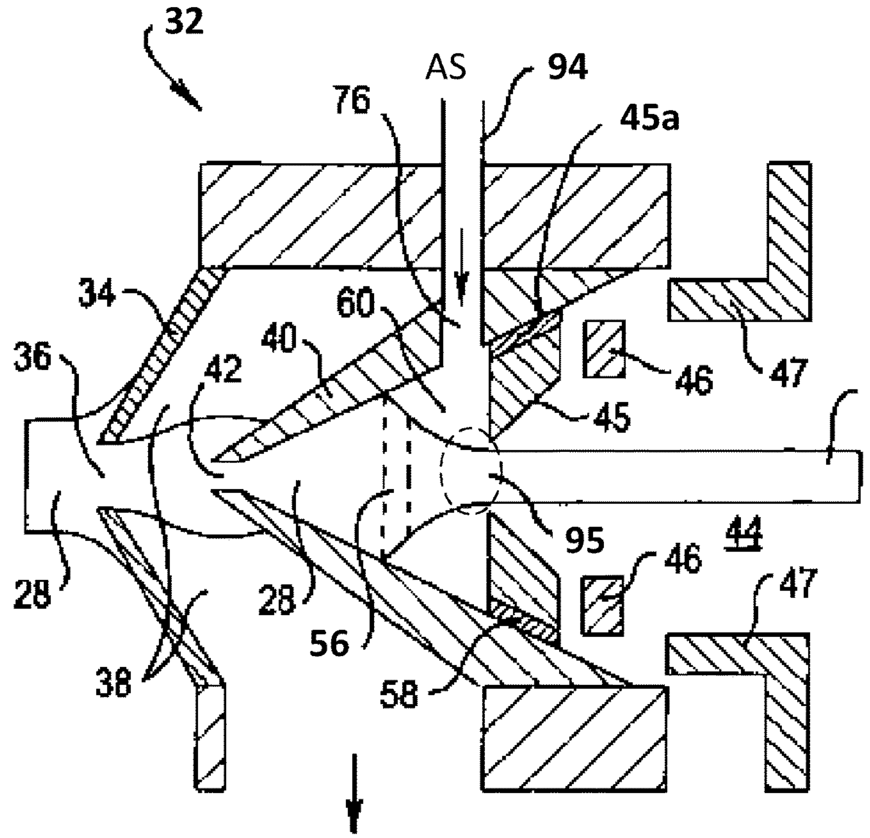

The interface arrangement 32 used for carrying out the method according to the present disclosure comprises at least one passage with an inlet and an outlet, the passage leading from an outside of the interface structure into a reaction zone formed in an area surrounding the outlet of the passage as illustrated in FIGS. 2*a*-2*c*, which show exemplary embodiments for an interface arrangement 32 with at least one passage in at least one cone.

The interface arrangement 32 shown in FIG. 2*a* has a sampling cone 34 and a skimmer cone 40 similar to that shown in FIG. 1. The ion plasma flux 28 flows through hole 36 in sampling cone 34 into the first vacuum region 38 and through hole 42 into the second vacuum region 44 held at a pressure lower than that of the first vacuum region. The skimmer cone 40 includes a passage 60 leading from an inlet 62 to an outlet 63 at the hole 42 of the skimmer cone 40. While such arrangement conventionally was used to create a reaction/collision zone, the present disclosure uses the passage 60 to supply the analyte substance AS into the reaction zone 64 where it interacts with the plasma 28 thereby softly ionizing the analyte substance AS. The exact dimensions of the reaction zone 64 depend on several factors, e.g., properties of the plasma. The shape of the reaction zone in FIG. 2*a* is thus only exemplarily and can vary from device to device.

A second preferred embodiment of the interface arrangement 32 is shown in FIG. 2*b*. In contrast to the embodiment shown in FIG. 2*a*, in case of FIG. 2*b* the sampling cone 34 comprises a second passage 74 with inlet 72 and outlet 75 creating a second reaction zone 76 in proximity to hole 36. The two passages 60 and 74 can be used in different ways. As indicated in FIG. 2*a*, a reagent gas RG may be supplied via passage 72 while the analyte sample AS is supplied via passage 60. However, in other embodiments, e.g., the reagent substance RS may also provide via passage 60 while the analyte sample AS is supplied via passage 74. One single passage 60, 74 can also be used for supplying both reagent substance RS and analyte sample AS.

A third preferred embodiment for an interface arrangement 32 is shown in FIG. 2*c*. In contrast to the embodiment shown in FIG. 2*b*, the skimmer cone 40 is provided with two passages 60 and 88. The third passage 88 also has an inlet 90 and an outlet 91, which in the present embodiment leads into the first reaction zone 64. Again, many different possibilities exist for using the different passages 60, 74, 88, and for supplying one or more reagent substances RS and analyte samples AS which all fall under the scope of the present disclosure.

Finally, another preferred embodiment of the interface arrangement 32 is subject to FIG. 2*c*. Again, the interface arrangement 32 includes a sampler cone 34 and a skimmer cone 40 followed by an ion optical system including an ion extraction electrode 45 mounted on the skimmer cone 40 by a dielectric seal 45*a* and other electrodes 46 and 47 to extract ion beam 58. For this embodiment, the at least one passage 94 is provided behind the skimmer cone 40 for supplying the analyte sample AS into reaction zone 95.

It shall be noted that the different embodiments for the interface arrangement 32 shown can arbitrarily combined with each other. Further, it shall be noted that the present disclosure is by no means limited to the embodiments shown. For instance, any embodiment for an interface arrangement 32 or interface structure 32, 40 e.g., as disclosed in U.S. Pat. No. 7,329,863 B2 and U.S. Pat. No. 7,119,330 B2.

In summary, the present disclosure provides for a possibility to combine conventional ICP-MS for elemental analysis with organic analysis of molecules in one single device. To achieve this, passages 60, 74, 88, 94 conventionally provided for reducing interferences by supplying collision gases, now and for the first time, are used to supply the analyte sample AS into the mass spectrometry device. The analyte sample AS, in particular a molecular sample, are either ionized by the incoming already cooled down plasma, the residual plasma, or by a carrier gas, e.g., stemming from the ion source 20.

It is furthermore possible to add additional reagent substances RD via the at least one passage 60, 74, 88, 94 to produce specific product ions by chemical ionization, that can be analyzed by the subsequent mass spectrometry analyzing section.

Figure 3:
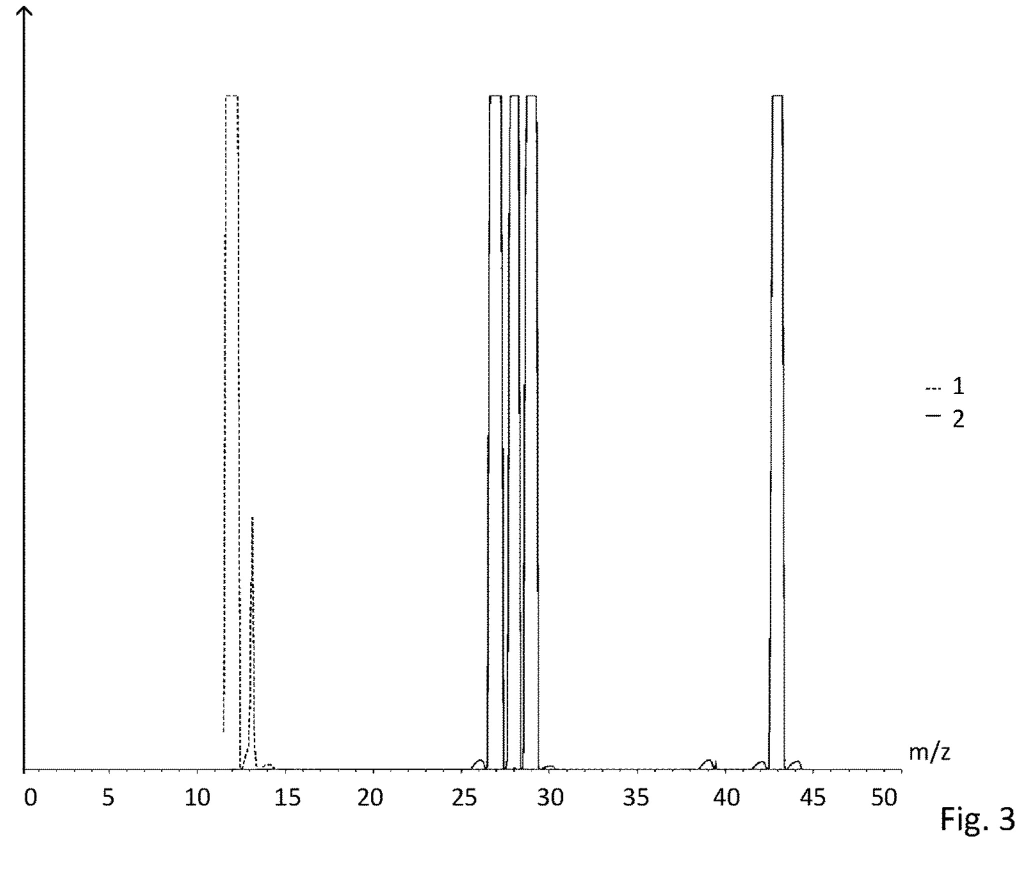
FIG. 3 shows a mass spectrum of propane obtained with a method according to the present disclosure.

FIG. 3 shows two mass spectra of propane, mass spectrum 1 obtained with a conventional ICP mass spectrometer apparatus 10, and mass spectrum 2 obtained with a method and device 10 according to the present disclosure, i.e. the analyte sample AS is introduced via a passage 60, 74, 88, 94 of interface arrangement 32, using an entrance-based collision/reaction cell. By introducing the analyte sample AS into the passage 60, 74, 88, 94 instead of directly providing it to the area where the plasma is produced, the ionization process of the analyte sample AS becomes much softer and does not lead to a decomposition of the molecules (spectrum 2), compared to the standard procedures used in ICP-MS (spectrum 1). Only in spectrum 2 the propane molecules of the analyte sample AS shown in FIG. 3 remain intact (44 Da) or partially fragmented (e.g., 43 Da—corresponding to a loss of one hydrogen, 26-30 DA—corresponding to various $C_2H_n$ fragments). The present disclosure therefore expands the scope of application of ICP-MS devices towards molecular analysis in a straightforward manner.

We claim:

1. A method of operating an inductively coupled plasma mass spectrometry apparatus for analyzing an analyte sample, wherein the mass spectrometry apparatus comprises:
- a plasma ion source;
- a mass analyzer; and
- an interface arrangement disposed between the plasma ion source and the mass analyzer, the interface arrangement comprising an interface structure including at least one cone and a passage having an inlet and an outlet, wherein the passage extends from an exterior of the interface structure into a reaction zone defined in an area surrounding the outlet of the passage, the method comprising:
- generating a plasma using the plasma ion source and forming a plasma flux to flow towards the mass analyzer;

supplying the analyte sample into the reaction zone via the passage such that the analyte sample interacts with the plasma flux; and analyzing the analyte sample using the mass analyzer.

2. The method of claim 1, wherein at least one reagent substance is added which is selected to generate specific ions of the analyte sample by chemical ionization.

3. The method of claim 2, wherein the at least one reagent substance is one of H2, O2, H2O, NH3, NO3 or any ionized, protonated or deprotonated derivative thereof.

4. The method of claim 2, wherein the analyte sample and/or the reagent substance is/are supplied via the passage at least during a first time interval, and wherein the analyte sample and/or the reagent substance is/are supplied into an area of the plasma ion source at least during a second time interval.

5. The method of claim 1, wherein the plasma ion source is a microwave induced plasma source.

6. The method according to claim 5, wherein argon, nitrogen, krypton, xenon, neon, helium or any mixture of at least two gases is a carrier gas for the plasma ion source.

7. The method of claim 1, wherein the analyte sample is split into at least two sub-parts based on at least one physical and/or chemical property of components of the analyte sample before being supplied into reaction zone via the passage, and wherein the at least two sub-parts are separately and serially supplied into the reaction zone.

8. The method of claim 1, wherein the mass spectrometry apparatus further comprises an ion optical system configured to establish a reflecting electrostatic field adapted to reflect ions along a desired path towards the mass analyzer.

9. The method of claim 1, wherein the interface structure is configured as to:

separate a first vacuum region at a relatively high pressure adjacent a first surface of the interface structure, which receives the plasma flux from the plasma ion source from a second vacuum region at a relatively low pressure adjacent a second surface of the interface structure, which is connected to the mass analyzer; and define an aperture having axial extension defining the reaction zone located between the first surface and the second surface of the interface structure, through which the plasma flux flows from the first region towards the second region, and wherein the passage connects into the reaction zone in the aperture of the interface structure.

10. The method of claim 1, wherein the at least one cone of the interface arrangement includes a sampling cone or a skimmer cone.

11. The method of claim 1, wherein the at least one cone of the interface arrangement includes a sampling cone and a skimmer cone, the skimmer cone disposed behind of the sampling cone.

12. The method of claim 11, wherein the passage is located behind of the sampler cone, the skimmer cone and/or an additional cone.

13. The method of claim 1, wherein the passage is completely located within the at least one cone.

14. The method of claim 1, wherein the interface arrangement includes at least two passages.

15. A method of molecular analysis of a molecular analyte sample, the method comprising:

providing an inductively coupled plasma mass spectrometry apparatus, comprising:

a plasma ion source;

a mass analyzer; and an interface arrangement disposed between the plasma ion source and the mass analyzer, the interface arrangement comprising an interface structure including at least one cone and a passage having an inlet and an outlet, wherein the passage extends from an exterior of the interface structure into a reaction zone defined in an area surrounding the outlet of the passage; and performing a molecular analysis of the molecular analyte sample using the mass spectrometry apparatus.

* * * * *